Patented May 13, 1952

2,596,496

UNITED STATES PATENT OFFICE 2,596,496

NONCOMBUSTIBLE COATING COMPOSITION AND METHOD OF APPLYING

Paul E. Marling and Morris L. Nielsen, Dayton, Ohio, assignors to Monsanto Chemical Company, St. Louis, Mo., a corporation of Delaware No Drawing. Application December 30, 1948, Serial No. 68,410

6 Claims. (Cl. 260—735)

This invention relates to new compositions of matter and the manner of producing them. The invention specifically relates to materials having utility as non-combustible coating compositions.

It is an object of the invention to provide a composition of matter which may be applied to combustible products. The coating composition may also be applied on metallic, ceramic and analogous surfaces and has been found to obviate the danger of flashing such as is common in the use of lacquers and varnishes. The invention, likewise, relates to a method for producing the compositions of the present invention, and the process of rendering otherwise flammable materials safe against the propagation of fire.

In accordance with the terminology which has developed in this field, "flameproofing" means the treatment of a material so that it is resistant to the propagation of flame across its surface after the igniting flame has been removed; that is, a properly flameproofed material will not support combustion independently of an external source of heat. In contact with an open flame, however, or at elevated temperature, flameproofed, organic materials can be expected to char and decompose.

The technical term "flameproofing" is used herein according to the definitions and requirements set forth in the ASTM Standards 1944 Yearbook under test (D626–41T) BS III, 1930, and also the Army Quartermaster Corps Test JQD 242.

It has been found that flameproofing compositions suitable for use as non-combustible, coating films may be produced from mixtures of chlorinated rubber and the water-insoluble reaction product of phosphoryl chloride and anhydrous ammonia.

The reaction product of phosphoryl chloride and ammonia is described by Mellor in Comprehensive Treatise on Organic and Theoretical Chemistry, 8, 713 (Longmans, Green and Company, New York, 1928) may be used in the present invention. A more suitable material for the present purpose is that described in copending patent application, Serial No. 68,402, filed December 30, 1948, and assigned to the same assignee as is the present case. The latter material possesses a neutral to alkaline reaction and lower solubility in contrast to the acid reaction and greater solubility possessed by the Mellor product, and for these reasons is preferred in the present combination. The nitrogen-phosphorus atomic ratio is approximately 1.80:1, but may be varied within the range of 1.5:1 to 2.0:1 by variation of the amount of $NH_3$ initially reacted with the $POCl_3$, and this product to some degree polymerized, and then subjected to heating as described above, to complete the polymerization. The preferred N:P ratio suitable for most purposes varies from 1.70:1 to 1.95:1.

The reaction product of phosphoryl chloride and ammonia, functions in combination with the chlorinated rubber to reduce the burning tendency or flammability of the coating film, while also reducing the magnitude of the after-glow phenomenon herein-described.

In the problem of reducing the danger of fire in the use of chlorinated rubber coating compositions, it is obvious that the large proportion of carbon and hydrogen which are present in such materials, despite the presence of chlorine, renders these materials susceptible to combustion. In particular, such rubber base materials have been found to burn by flameless combustion after contact with a flame, with the result that such flameless combustion or after-glow may entirely consume the resinous material, even though only a portion thereof has been exposed to flame. This result is particularly dangerous in coating compositions, which may, by this means, propagate a fire, even though it may appear to have been extinguished at one point. This phenomenon is described in the case of cotton fabrics in an article by K. S. Campbell and J. E. Sands in Textile World, April, 1946.

It is also known that certain metallic oxides, such as antimony oxide, which have been utilized in some flameproofing treatments and in various coating formulations, accelerate the catalytic reaction which appears to be the cause of this "after-glow" phenomenon. In these cases a flameless combustion may occur in a greatly accentuated form. In studies made in the flameproofing of cellulosic materials, this phenomenon may be primarily responsible for the production of an undesirable after-glow or "flameless" combustion.

The combination of the present invention utilizing the reaction product of phosphoryl chloride and ammonia, provides both phosphorus and nitrogen which apparently react chemically with the constituents of the chlorinated rubber to reduce the above-described catalytic effect, so that the coating composition is not only of reduced flammability, but also obviates the danger of after-glow.

The combination of chlorinated rubber in association with the phosphorus-nitrogen compound yields products which may be utilized in producing coating compositions formulated for various purposes. Such coating compositions may be applied by conventional means, such as brushing, spraying, dipping, or impregnation of various products.

The chlorinated rubber may be natural or synthetic rubber of any desired viscosity, and chlorinated to 30% to 80% chlorine content, such as is conventional in the art, and is described in U. S. Patent No. 2,401,133, and by C. Ellis in Chemistry of Synthetic Resins, Chapter 55 (Reinhold Publishing Company, 1935).

Illustrative of the combination of the chlorinated rubber, together with the reaction products of phosphoryl chloride and anhydrous ammonia, also referred to herein as polyphosphorylamide, the following examples show certain embodiments thereof without, however, being limitative of the scope of the invention.

Example 1

|  | Grams |
|---|---|
| (A) Chlorinated rubber (300 c. p. viscosity) | 50 |
| Xylene | 150 |
| (B) Solution A | 20 |
| Tricresyl phosphate | 2 |
| (C) Polyphosphorylamide | 5 |

When formulated in a coating composition and tested as a film, chlorinated rubber alone (solution A) burned vigorously, illustrating the unsuitability of chlorinated rubber alone as a fire-retarding coating material. When solutions A and B were combined to furnish a plasticized material and tested as a film, it was found that this composition also burned freely.

When, however, solutions A and B were first mixed, and then combined with C, the resulting, dried film did not burn. Test panels of this same composition painted upon wood also showed that the film of the coating material did not burn and was of sufficient stability when subjected to a flame to protect the otherwise combustible base material.

Example 2

| | | |
|---|---|---|
| (A) Chlorinated rubber (300 c. p. viscosity) | parts | 50 |
| Xylene | do | 150 |
| Tricresyl phosphate | do | 2 |
| (B) Solution (A) above | do | 20 |
| (C) Polyphosphorylamide | grams | 6 |
| Xylene (to wet polyphosphorylamide) | grams | 20 |
| (D) Component (B) above | do | 44 |

The components utilizing the chlorinated rubber and phosphate plasticizer alone were found to burn freely after application as a film to a wood panel. However, the complete formulation, including the polyphosphorylamide, was found to give a film which did not burn. The final film also had the advantage of being produced as a smooth, uniform coating which did not show any graininess. The coating film was flexible and showed good adhesion.

Example 3

The formulation of Example 2 was modified by the addition of 2 grams of titanium dioxide. This coating composition was applied to a test panel and was then air dried and baked for one-fourth hour at 300° F. Upon exposure to a flame the film did not burn and showed good flexibility and a hard, white surface.

Example 4

|  | Grams |
|---|---|
| (A) Chlorinated rubber (300 c. p. viscosity) | 50 |
| Xylene | 150 |
| (B) Solution (A) above | 40 |
| Tricresyl phosphate | 4 |
| Polyphosphorylamide | 8 |
| Titanium dioxide | 4 |

The above components were mixed to give a uniform dispersion. This material was then applied as a coating upon test panels, air dried for one-half hour, and was then baked at 300° F. for one-fourth hour. These test films showed good stability on aging and were found to be unaffected by outdoor exposure. The film obtained by applying a coating of the above formulation was found to resist a flame, so that no flaming or glowing of the film took place.

Formulations of coating compositions based upon the present invention may employ various plasticizers to render the film flexible and to modify the application characteristics. Chlorinated diphenyl, for example, may be utilized as a plasticizer. Various solvents may also be utilized. For example, dichlorethylene is advantageously employed in these compositions.

The present coating composition essentially comprises a liquid vehicle, a chlorinated rubber base and the reaction product of phosphoryl chloride and ammonia, such as polyphosphorylamide in the concentration range of 10% to 50%, by weight, of the contained solids therein. High proportions of the polyphosphorylamide are not objectionable, since this material also acts as a pigment, which is particularly advantageous in making white and other light-colored coatings.

Chlorinated paraffin may also be employed as an additional material in the coating compositions of the present invention, if desired. This material serves as a binder to aid in maintaining the dispersive coating in a form suitable for shipment and for ultimate application as a non-combustible coating.

Antimony oxide, although showing a tendency to promote flameless combustion or after-glow, may also be employed in the coating compositions of the present invention by reason of the presence therein of the polyphosphorylamide. This material apparently fuses in the presence of a high temperature, possibly reacting with the acidic components of the chlorinated rubber and/or chlorinated paraffin to yield antimony oxychloride, which aids in coating the base material and preventing the propagation of a flame.

The coatings are also of great utility when applied to metal surfaces. In such cases the coating prevents the flash combustion, such as is characteristic of prior art varnishes, lacquers and paints.

This application contains subject matter in common with certain other applications assigned to the same assignee as is the present application: Serial No. 68,402, filed December 30, 1948; Serial No. 68,403, filed December 30, 1948; Serial No. 68,404, filed December 30, 1948; Serial No. 68,405, filed December 30, 1948; Serial No. 68,406, filed December 30, 1948; Serial No. 68,407, filed December 30, 1948; Serial No. 68,408, filed December 30, 1948; Serial No. 68,409, filed December 30, 1948; Serial No. 68,411, filed December 30, 1948.

It will be obvious to those skilled in the art that changes in the coating composition may

What is claimed and desired to be protected by Letters Patent of the United States is:

1. A coating composition essentially comprising a liquid vehicle and the water-insoluble reaction product of at least 5 moles of phosphoryl chloride with one mole of anhydrous ammonia in which the nitrogen-phosphorus ratio is from 1.5:1 to 2.0:1, in combination with chlorinated rubber, said reaction product being present in the said coating composition to the extent of from 10% to 50% by weight of total solids.

2. A coating composition comprising a liquid vehicle, containing chlorinated rubber and the water-insoluble reaction product of phosphoryl chloride and anhydrous ammonia in which reaction product the nitrogen-phosphorus ratio is from 1.5:1 to 2.0:1, said reaction product being present in the said coating composition to the extent of from 10% to 50% by weight of total solids.

3. The process of coating a combustible material which comprises applying to said material a mixture of chlorinated rubber in combination with the water-insoluble reaction product of phosphoryl chloride and anhydrous ammonia in which reaction product the nitrogen-phosphorus ratio is from 1.5:1 to 2.0:1, said mixture comprising from 10% to 50% by weight of the said reaction product.

4. The process for protecting combustible materials against the propagation of flame which comprises applying to surfaces thereof an organic, liquid, resinous, film-forming, pigment-containing composition, the said composition comprising essentially chlorinated rubber and the water-insoluble reaction product of phosphoryl chloride and anhydrous ammonia, the nitrogen-phosphorus ratio of the said reaction product being from 1.5:1 to 2.0:1, and the said composition containing from 10% to 50% by weight of the said reaction product.

5. The process for protecting surfaces against the propagation of flame comprising applying to surfaces thereof an organic-liquid containing chlorinated rubber and a dispersion of the water-insoluble reaction product of phosphoryl chloride and anhydrous ammonia, said reaction product having a nitrogen-phosphorus ratio of 1.5:1 to 2.0:1 and said reaction product being present in the composition to the extent of from 10% to 50% by weight of total solids.

6. A flameproof article comprising a base material otherwise characterized by ease of burning, which base material is protected against the propagation of flame by an organic, resinous film having dispersed thereon chlorinated rubber and a water-insoluble reaction product of phosphoryl chloride and anhydrous ammonia, the nitrogen-phosphorus ratio of said reaction product being from 1.5:1 to 2.0:1, and the said reaction product being present to the extent of from 10% to 50% by weight of the total solids.

PAUL E. MARLING.
MORRIS L. NIELSEN.

REFERENCES CITED

The following references are of record in the file of this patent:

UNITED STATES PATENTS

| Number | Name | Date |
|---|---|---|
| 2,052,886 | Leroy | Sept. 1, 1936 |
| 2,163,085 | Cupery | June 20, 1939 |
| 2,250,483 | Hopkinson | July 29, 1941 |
| 2,401,440 | Thomas et al. | June 4, 1948 |
| 2,464,342 | Pollack | Mar. 15, 1949 |